United States Patent
Yin

(10) Patent No.: US 10,480,984 B2
(45) Date of Patent: Nov. 19, 2019

(54) DEVICE, CONTAINER AND METHOD FOR MEASURING LIQUID VOLUME IN CONTAINER BASED ON PRESSURE SENSING

(71) Applicant: Shenzhen Mecare Network Technology Co., Ltd., Shenzhen (CN)

(72) Inventor: Kuo Yin, Shenzhen (CN)

(73) Assignee: Shenzhen Moikit Network Technology Co., Ltd., Shenzhen (CN)

( * ) Notice: Subject to any disclaimer, the term of this patent is extended or adjusted under 35 U.S.C. 154(b) by 123 days.

(21) Appl. No.: 15/831,147

(22) Filed: Dec. 4, 2017

(65) Prior Publication Data

US 2018/0120141 A1    May 3, 2018

Related U.S. Application Data

(63) Continuation of application No. PCT/CN2015/082353, filed on Jun. 25, 2015.

(30) Foreign Application Priority Data

Jun. 8, 2015 (CN) .......................... 2015 1 0310397

(51) Int. Cl.
   *G01F 23/18* (2006.01)
   *G01F 22/02* (2006.01)
   (Continued)

(52) U.S. Cl.
   CPC ............ *G01F 23/18* (2013.01); *G01F 13/006* (2013.01); *G01F 22/02* (2013.01); *B65D 47/40* (2013.01); *B67D 1/0431* (2013.01); *G01F 17/00* (2013.01)

(58) Field of Classification Search
   CPC ......... G01F 11/021; G01F 17/00; G01F 22/02
   See application file for complete search history.

(56) References Cited

U.S. PATENT DOCUMENTS 2,668,437 A * 2/1954 Patch ........................ G01N 7/00
                                                       73/1.61
3,060,735 A * 10/1962 Baker ...................... G01F 17/00
                                                       73/149

(Continued)

FOREIGN PATENT DOCUMENTS

| CN | 1053120 A | 7/1991 |
| CN | 1906378 A | 1/2007 |

(Continued)

*Primary Examiner* — David A Rogers
(74) *Attorney, Agent, or Firm* — Wayne & Ken, LLC; Tony Hom

(57) ABSTRACT

The invention discloses a device, a container and a method for measuring a liquid volume in a container based on pressure sensing. The measuring device includes a compression member, a pressure sensor, a force transmission member, an air pressure sensor and a controller. The compression member is hermetically connected to the container under measurement to form a sealed space in the container, and compresses the air in the sealed space under external force; the force transmission member converts the air pressure in the sealed space into a pressure applied on the pressure sensor; and the pressure sensor measures the pressure applied from the force transmission member before and after the compression. The present invention accurately measures the liquid volume in the container, effectively eliminates the impact of the shaking of the liquid on the measurement result, and is conveniently used to detect water quality in the natural usage.

20 Claims, 9 Drawing Sheets

(51) Int. Cl.
  *G01F 13/00* (2006.01)
  *B65D 47/40* (2006.01)
  *B67D 1/04* (2006.01)
  *G01F 17/00* (2006.01)

(56) References Cited

U.S. PATENT DOCUMENTS

| | | | |
|---|---|---|---|
| 3,956,934 A | 5/1976 | White | |
| 4,144,749 A * | 3/1979 | Whitmore | G01F 17/00 73/149 |
| 4,841,982 A * | 6/1989 | Nikiforov | A01K 1/06 128/200.14 |
| 5,620,005 A * | 4/1997 | Ganshorn | A61B 5/0806 600/529 |
| 6,910,373 B2 * | 6/2005 | Dempster | E05D 3/12 16/235 |
| 7,310,999 B2 * | 12/2007 | Miller | A61B 5/103 128/205.26 |
| 7,658,103 B2 * | 2/2010 | Nakamura | G01F 22/02 73/290 R |
| 8,413,488 B2 * | 4/2013 | Belitsch | G01N 9/04 73/54.09 |
| 8,561,459 B2 * | 10/2013 | Caldwell | G01F 22/02 73/149 |
| 9,250,110 B2 * | 2/2016 | Christ | G01F 23/18 |
| 9,459,128 B2 * | 10/2016 | Koltay | G01F 15/02 |
| 10,006,796 B2 * | 6/2018 | Li | G01F 22/02 |
| 10,173,817 B2 * | 1/2019 | Li | B65D 1/0207 |
| 2007/0068241 A1 * | 3/2007 | Bains | G01F 17/00 73/149 |
| 2007/0190664 A1 * | 8/2007 | Kimura | B41J 2/17513 436/174 |
| 2010/0126265 A1 * | 5/2010 | Nakamura | G01F 22/02 73/149 |
| 2011/0077876 A1 * | 3/2011 | Ellingsen | B01L 3/0293 702/55 |
| 2011/0126614 A1 * | 6/2011 | Belitsch | G01N 11/04 73/54.04 |
| 2013/0276524 A1 * | 10/2013 | Christ | G01F 17/00 73/149 |
| 2013/0327787 A1 * | 12/2013 | Koltay | G01F 15/02 222/61 |
| 2016/0041079 A1 * | 2/2016 | Chertov | G01N 15/088 73/38 |

FOREIGN PATENT DOCUMENTS

| | | | | |
|---|---|---|---|---|
| CN | 101048644 A | 10/2007 | | |
| CN | 201731910 U | 2/2011 | | |
| CN | 102985352 A | 3/2013 | | |
| CN | 204730908 U | 10/2015 | | |
| DE | 3320793 A1 * | 12/1984 | | F02B 77/087 |
| DE | 4127233 A1 | 2/1993 | | |
| GB | 1223848 A | 3/1971 | | |

* cited by examiner

DEVICE, CONTAINER AND METHOD FOR MEASURING LIQUID VOLUME IN CONTAINER BASED ON PRESSURE SENSING

TECHNICAL FIELD

The present invention relates to the field of intelligent equipment, and more specifically to a device for measuring a liquid volume. The present invention further relates to a container for measuring an internal liquid volume and a method for measuring the liquid volume in the container.

BACKGROUND OF THE PRESENT INVENTION

Water serves as a life source, is an essential substance for life of people, and is helpful for people to keep the health in a correct drinking mode. However, in the past, people rely on their own feelings to drink water and cannot intuitively understand amount of their own water drinking. With the improvement of the health awareness of people and the improvement of the technology, the intelligent water drinking device is popular with people, and the amount of water taken by people for one day can be accurately measured, so that people can reasonably plan amount of their own water drinking, and meanwhile, the drinking water data becomes an important part in the whole large health data. But the existing intelligent water drinking device is generally provided with a measuring device on a container, and the method has some defects: firstly, due to the requirements of water leakage prevention, heat preservation and other aspects, the self structure (including shapes, materials, functions and the like) has certain limitation, therefore, the adding of the measuring device can further increase the design and manufacturing difficulty of the container, and the product cost is increased; secondly, the measuring device does not have universality, and each container needs to be independently designed, so the production cost is further increased; thirdly, an existing measuring device is generally a liquid level sensor, and the stability is poor, the measurement error caused by the inclination of the container and the shape of the container can be easily caused, so the requirement for accurate measurement is difficult to meet.

Therefore, there is a great need for a measuring device with high universality and good measuring stability.

SUMMARY OF THE PRESENT INVENTION

In order to overcome the defects in the prior art, the present invention provides a device for measuring a liquid volume in a container based on pressure sensing, which accurately measures the liquid volume in the container, effectively eliminates the impact of the shaking of the liquid on the measurement result, and has a good measuring stability; containers of different materials, functions and volumes can be matched, thus having a high versatility. Besides, the present invention is convenient to use, and the water volume detection is completed in a natural usage without special operations.

The present invention provides a container for measuring the volume of internal liquid.

The present invention provides a method for measuring the liquid volume in the container based on pressure sensing.

The present technical solution adopted by the present invention to solve the technical problem is as follows:

a compression member; the compression member is hermetically connected to the container to be detected to form a sealed space in the container, and compresses air in the sealed space under an external force; a volume value of the compressed air is a determined value;

a pressure sensor and a force transmission member; the force transmission member converts an air pressure in the sealed space into pressure applied to the pressure sensor, and an area value of a stress surface is a determined value; the pressure sensor detects a pressure value from the force transmission member before and after the compression;

an air pressure sensor for detecting an ambient air pressure value; and a controller; the controller is configured to receive the pressure value obtained by the pressure sensor and the ambient air pressure value obtained by the air pressure sensor, and calculates the liquid volume in the container to be detected based on the pressure value, the ambient air pressure value, the volume value, the area value and the volume value of the container to be detected.

As a further improvement mode of the above scheme, the device further comprises at least one limiting device for limiting a movement of the compression member after the compression member moves a fixed distance.

As a further improvement mode of the above scheme, there are at least two limiting devices and the two limiting devices are located on a same horizontal plane, and the limiting devices are made of a conductive material; the pressure sensor performs a first detection of the pressure value before compression; and performs a second detection of the pressure value in the sealed space when being conducted between the limiting devices.

As a further improvement mode of the above scheme, the limiting device comprises at least one fixing member and an elastic member correspondingly arranged under the fixing member; the fixing member and the elastic member are made of conductive materials; the elastic member moves elastically so as to have a first state of conducting with the fixing member and a second state of disconnecting from the fixing member; the pressure sensor performs the first detection of the pressure value before compression, and performs the second detection of the pressure value when the elastic member is in the first state.

As a further improvement mode of the above scheme, the compression member is a cover body, and the cover body is provided with an extending part with a fixed and known size; and a sealing ring is arranged on a periphery of the extending part.

As a further improvement mode of the above scheme, a cavity communicated with the outside is provided on the extending part, and the cavity is isolated from the sealed space through the force transmission member, and the pressure sensor is arranged in the cavity.

As a further improvement mode of the above scheme, the force transmission member comprises a rigid force-bearing sheet, the rigid force-bearing sheet is hermetically connected with an inner wall of the cavity through a flexible silicon sheet arranged on the periphery of the rigid force-bearing sheet, and the flexible silicon sheet is of a wave-shaped structure.

As a further improvement mode of the above scheme, further comprising a temperature measuring device for measuring a temperature of the rigid force-bearing sheet, and the rigid force-bearing sheet is made of a heat conduction material.

As a further improvement mode of the above scheme, a temperature insulation layer is arranged between the rigid force-bearing sheet and the pressure sensor.

A device for measuring a liquid volume in a container based on pressure sensing, comprising:

a compression member; the compression member is hermetically connected to the container to be detected to form a sealed space in the container, and compresses air in the sealed space under an external force; a volume value of the compressed air is a determined value;

a pressure sensor and a force transmission member; the force transmission member converts an air pressure in the sealed space into pressure applied to the pressure sensor, and an area value of a stress surface is a determined value; the pressure sensor detects a pressure value from the force transmission member before and after the compression;

an air pressure sensor for detecting an ambient air pressure value;

a volume detection device arranged on the compression member and used for detecting the volume value of the compressed air; and a controller, the controller is configured to receive the pressure value obtained by the pressure sensor and the ambient air pressure value obtained by the air pressure sensor, and calculate the liquid volume in the container to be detected based on the pressure value, the ambient air pressure value, the volume value, the determined area value and the volume value of the container to be detected.

As a further improvement mode of the above scheme, the volume detection device comprises an angle sensor and a thread arranged on the compression member, a thread pitch of the thread is fixed and known; the angle sensor is used for detecting a rotating angle value of the compression member, and transmitting the angle value to the controller.

As a further improvement mode of the above scheme, the compression member is a cover body, and the cover body is provided with an extending part with a fixed and known size; and a sealing ring is arranged on a periphery of the extending part.

As a further improvement mode of the above scheme, a cavity communicated with the outside is provided on the extending part, and the cavity is isolated from the sealed space through the force transmission member, and the pressure sensor is arranged in the cavity.

As a further improvement mode of the above scheme, the force transmission member comprises a rigid force-bearing sheet, the rigid force-bearing sheet is hermetically connected with an inner wall of the cavity through a flexible silicon sheet arranged on the periphery of the rigid force-bearing sheet, and the flexible silicon sheet is of a wave-shaped structure.

As a further improvement mode of the above scheme, further comprising a temperature measuring device for measuring a temperature of the rigid force-bearing sheet, and the rigid force-bearing sheet is made of a heat conduction material.

As a further improvement mode of the above scheme, a temperature insulation layer is arranged between the rigid force-bearing sheet and the pressure sensor.

A container for measuring the volume of an internal liquid, the container is provided with a container opening and comprises the device for measuring the liquid volume in the container based on pressure sensing as described above, the device is hermetically connected with the container opening through the compression member, and the sealed space is formed in the container.

As a further improvement mode of the above scheme, a protrusion for winding a circle is arranged on an inner wall of the container.

As a further improvement mode of the above scheme, the container opening is made of a conductive material.

A method for measuring a liquid volume in a container based on pressure sensing, comprising the following steps:

S10, forming a sealed space in the container through a compression member; a pressure sensor and a force transmission member are arranged on the compression member, the force transmission member converts an air pressure in a sealed space into pressure applied to the pressure sensor, and an area value of a stress surface is a determined value; the pressure sensor detects the pressure value from the force transmission member before and after compression;

S20, compressing the air in the sealed space through movement of the compression member relative to the container;

S30, obtaining a liquid quantity detection parameter, comprising an air pressure value in the sealed space before compression, a pressure value detected by the pressure sensor before compression, a pressure value detected by the pressure sensor after the compression, an area value of the stress surface of the force transmission member, a volume value of the compressed air in the container, and a volume value of the container; and S40, acquiring the liquid volume in the container by using the liquid quantity detection parameter.

As a further improvement mode of the above scheme, the method for obtaining the volume value of the air in the container in the step S30 comprises: enabling an area of a compression surface on the compression member perpendicular to a movement direction and directly acting on the air is fixed and known, obtaining a movement distance value of the compression member; and the volume value of the compressed air is obtained by combining the area of the compression surface and the movement distance value.

As a further improvement mode of the above scheme, the method for obtaining the movement distance value of the compression member comprises the following steps: arranging a limiting device, so that the movement distance of the compression member each time is fixed and known.

As a further improvement mode of the above scheme, the method for obtaining the movement distance value of the compression member comprises: connecting the compression member with the container through a thread, and a thread pitch of the thread is fixed and known, detecting the angle value of rotating the compression member, and calculating the distance value through the angle value and the thread pitch.

As a further improvement mode of the above scheme, the method for the angle value detection is as follows: the method for detecting the angle value detection comprises: arranging an angle sensor, recording the value when the air begins to be compressed as a first angle value, and recording the value in the rotation process or at the end of rotation as a second angle value; and a difference value of the second angle value and the first angle value is the angle value of rotating the compression member at the corresponding moment.

As a further improvement mode of the above scheme, the method for obtaining the air pressure value in the sealed space before compression in the step S30 comprises: obtaining the ambient air pressure value by detecting the air pressure sensor, and then obtaining the pressure value in the sealed space before compression based on the pressure value in the sealed space before compression is equal to the ambient air pressure value.

As a further improvement mode of the above scheme, the method for acquiring the liquid volume in the container in the step S40 is as follows:

obtaining a difference value of a pressure change in the sealed space before and after compression and the air pressure value in the sealed space after compression, according to the formula:

$$\Delta P = (F_1 - F_0)/S$$

$$P_1 = P_0 + \Delta P$$

wherein, $\Delta P$ is the difference value of the pressure change in the sealed space before and after compression, $F_0$ is the pressure value obtained by detecting the pressure sensor before compression, and $F_1$ is the pressure value obtained by detecting the pressure sensor after compression, $P_0$ is the air pressure value in the sealed space before compression, and $P_1$ is the air pressure value in the sealed space after compression, and S is the area value of the stress surface of the force transmission member;

then, obtaining the volume value of the air in container before compression according to the formula:

$$V_1 = P_1 V_X/(P_0 - P_1)$$

wherein $V_1$ is the volume value of the air in the container before compression, $V_X$ is the volume value of the compressed air in the container; and obtaining the liquid volume in the container according to the formula:

$$V_2 = V - V_1$$

wherein $V_2$ is the volume value of the liquid in the container, and V is the volume value of the container.

The beneficial effects of the present invention are as follows. The present invention accurately measures the liquid volume in the container, effectively eliminates the impact of the shaking of the liquid on the measurement result, and has a good measuring stability. And containers of different materials, functions and volumes can be matched, thus having a high versatility. Besides, it is convenient to use, and the water volume detection is completed in a natural usage without special operations.

BRIEF DESCRIPTION OF THE DRAWINGS

The present invention is further described below with reference to the accompanying drawings and embodiments.

DETAILED DESCRIPTION OF THE PRESENT INVENTION

Figure 1:
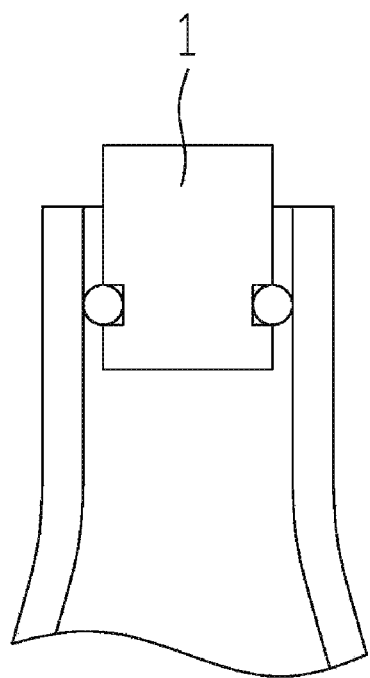
FIG. 1 is a schematic diagram of first embodiment of a compression member according to the present invention.

The conception, the specific structure and the technical effects of the present invention will be clearly and completely described below with reference to the embodiments and the accompanying drawings so as to fully understand the objectives, solutions and effects of the present invention. It should be noted that, in the case of no conflict, the embodiments in the present application and the features in the embodiments may be combined with each other.

It should be noted that, unless otherwise specified, when a feature is referred to as "fixed" and "connected" in another feature, it can be directly fixed, connected to another feature, or indirectly fixed, connected to another feature. In addition, the description of upper, lower, left, right and the like used in the present invention is only relative to the mutual positional relationship of the respective components of the present invention in the drawings.

Also, unless defined otherwise, all techniques and scientific terms used herein have the same meaning as commonly understood by those ordinary skill in the art. The terminology used in the description herein is for the purpose of describing particular embodiments only and not for the purpose of limiting the same. As used herein, the term "and/or" includes any and all combinations of one or more of the associated listed items.

The measuring device disclosed in the present invention at least comprises a compression member, a force transmission member, a pressure sensor, an air pressure sensor and a controller. The compression member forms a sealed space with a container containing the liquid to be detected and compresses the air in the sealed space under the external force. The force transmission member converts the air pressure in the sealed space into the pressure applied to the pressure sensor; the pressure sensor is used for acquiring the pressure value from the force transmission member before and after compression; under the condition that the area value of the stress surface of the force transmission is constant; the pressure sensor is used for detecting an ambient air pressure value; and the controller calculates a liquid volume in the container to be detected based on the pressure value, the ambient air pressure value, the area value of the stress surface, the volume value of the air compressed and the volume value of the container to be detected.

Figure 2:
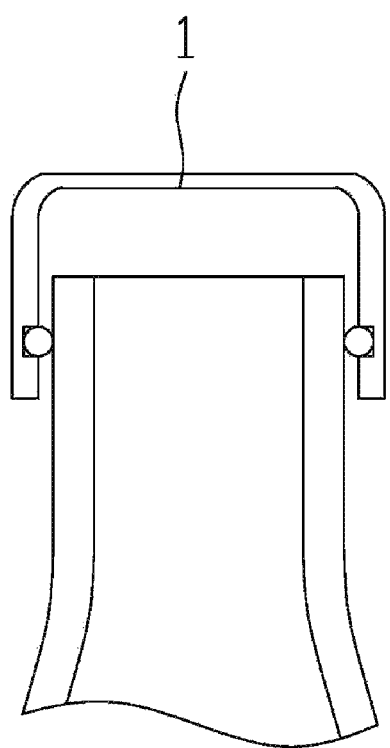
FIG. 2 is a schematic diagram of second embodiment of a compression member according to the present invention.
Figure 3:
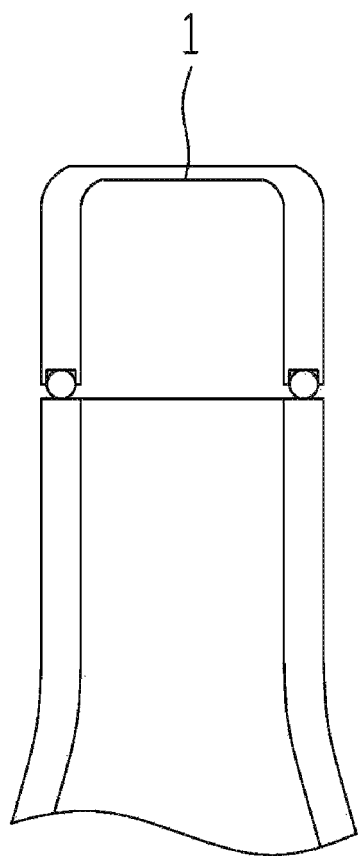
FIG. 3 is a schematic diagram of third embodiment of a compression member according to the present invention.

The compression member can be circular, square or other shapes, which is determined by the shape of the container opening, the compression member is sealed in a built-in manner. As shown in FIG. 1, the compression member 1 is columnar, and a sealing ring is arranged on the outer wall thereof, the compression member is stuffed into the container opening, and the sealing process is completed through the sealing ring and the inner wall of the container. The compression member can also be external, as shown in FIG. 2, the compression member 1 is arranged as a cover body, and a sealing ring is arranged on the inner wall of the cover body, the cover body is buckled with the container opening, and the sealing process is completed through the sealing ring and the outer wall of the container. In addition, the compression member 1 can also be in parallel sealed with the container, as shown in FIG. 3, the size of the sealing part of the compression member 1 is equal to the size of the container opening, and sealing is carried out through the sealing rings between the sealing part and the container opening; it can be understood that the three modes are combined with each other. The compression member can be directly connected with the container in a sealed mode, and the process is completed through other accessory structures.

The present invention discloses a static detection scheme of a measuring device. In the scheme, the obtaining of the value volume of the above air compressed is static, that is, the volume value is a definite value, and the definite value is stored in a controller; the definite value can be known through pre-limitation/measurement, and particularly, the value volume of the air compressed is equal to the volume of the compression member invaded into the sealed space, so that the detection of the compression volume is essentially the detection of the intrusion volume of the compression member; and under the condition that the cross sectional area of the compression member is certain, the invading volume is known only by obtaining the moving distance of the compression member, and the specific implementation mode is as follows:

the device comprises a limiting devices, wherein the limiting devices enable the compression member to move a fixed distance and then is abutted by the container so as to limit the movement of the compression member; by pre-limiting/measuring the distance value, the moving distance of the compressing member at each time is known accurately, and in combination with the area of the compression surface of the compression member (the compression surface refers to the direction perpendicular to the movement of the compression member and acts directly on the cross section of the compressed air, and the area of the compressed air can be known/measured in advance), the intrusion volume, namely, the volume value of the air is compressed, is obtained by a simple calculation. Preferably, referring to FIG. 4, the position where the compression member and the sealing structure just begin to form a sealing relation is taken as a starting point, the limiting devices 14 enables the compression member to be abutted by the container opening after being pressed by a certain distance h relative to the container, the h value can be limited to a definite value through the structure.

In an ideal situation, the measurement of the air pressure in the container needs to be synchronously started after the compression member is compressed. However, the above-mentioned limiting device only plays the role of limiting the displacement and obtaining the moving distance, the function of synchronous detection cannot be realized, and in order to solve the problem, the present invention discloses an improved mode of a limiting device.

Figure 6:
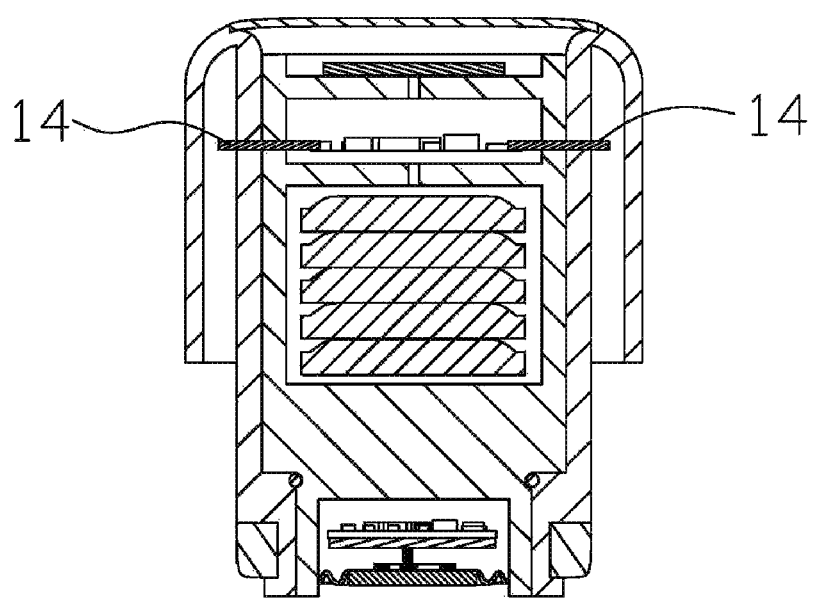
FIG. 6 is a cross-sectional view of first embodiment of a static detection scheme according to the present invention.

Referring to FIG. 6, there are at least two limiting devices 14 and are located in the same horizontal plane, the limiting device 14 is made of a conductive material, and the pressure sensor performs first detection of the pressure value before compression, and a second first detection of the pressure value is carried out when the limiting device is conducted between the limiting devices. The method is suitable for the container with a conductive function. When the container opening is in contact with the two limiting devices at the same time, the pressure sensor and the limiting device are communicated through the container, so that the pressure sensor is triggered to work.

Figure 7:
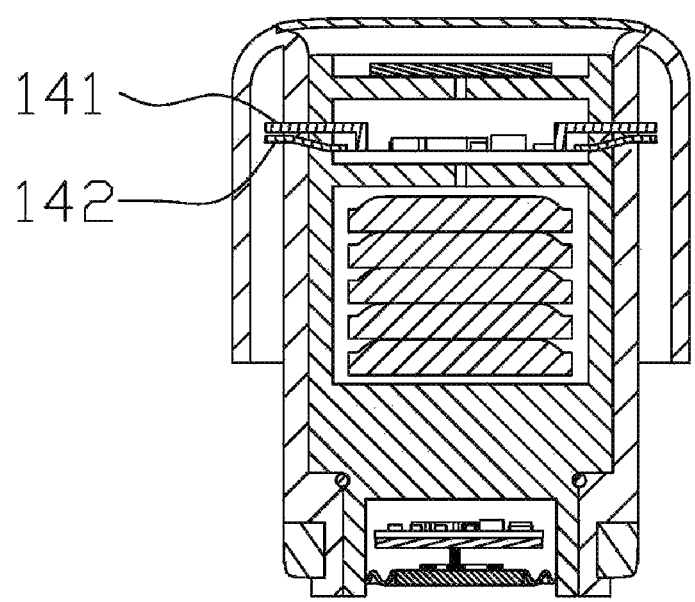
FIG. 7 is a cross-sectional view of second embodiment of a static detection scheme according to the present invention.

The above-mentioned embodiment is only suitable for container with a conductive function, but container made of insulating materials cannot achieved functions thereof. In addition, due to the existence of the error, the container may not be simultaneously in contact with the limit device, so that synchronous measurement cannot be realized. Therefore, the present invention discloses a further improvement mode, and referring to FIG. 7, the limiting devices comprises a fixing member 141 and an elastic member 142 correspondingly arranged below the fixing member 141, the fixing member 141 and the elastic member 142 are made of a conductive material, and the elastic member 142 moves elastically, so as to have a first state of conducting with the fixing member 141 and a second state of disconnecting from the fixing member 141; when the compression member moves downwards to a certain distance, the container opening abuts against the elastic member 142 to enable the elastic member 142 to be in contact with the fixing member 141, the method is not limited to the material of the container, so that the problems of the above embodiment is effectively solved.

Similarly, the pressure sensor performs the first detection of the pressure value before compression; and the second detection of the pressure value in the sealed space is carried out when the elastic member is in the first state.

Figure 8:
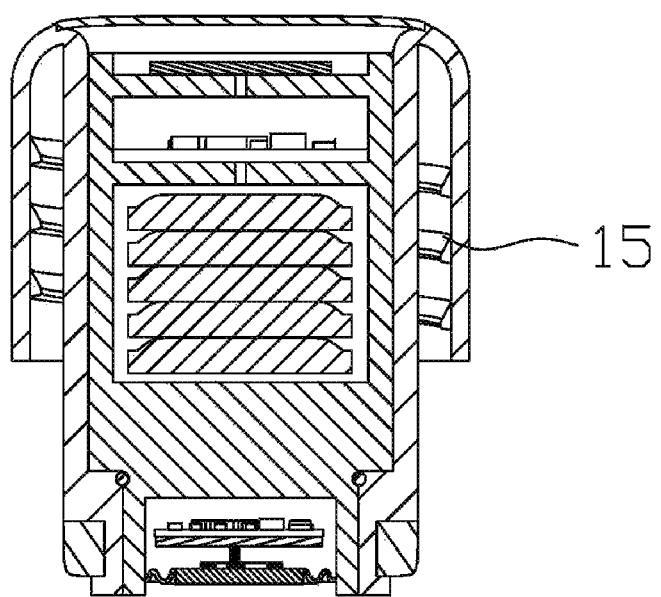
FIG. 8 is a cross-sectional view of third embodiment of a static detection scheme according to the present invention.

The present invention further discloses another scheme of the measuring device, similarly, the measuring device also comprises a compression member, a force transmission member, a pressure sensor, an air pressure sensor and a controller. Compared with the static detection scheme described above, the difference is that the volume value of the air compressed is not pre-input, but is detected in real time through a volume detection device, referring to FIG. 8, the volume detection device comprises a thread 15 arranged on the compression member 1, and the thread pitch of the thread is fixed and known, and the compression member 1 is connected to the container through the thread in a threaded manner, and can be screwed into and screwed out. The volume detection device also comprises an angle sensor (not shown) capable of detecting the rotating angle of the compression member 1, the sensor can transmit the obtained angle value to the controller. By combining the angle value and the thread pitch, the dynamic detection of the moving distance can be realized, and therefore the volume value of the air compressed is further determined.

It can be understood that the static detection scheme and the dynamic detection scheme are not absolutely independent, the two schemes can be combined with practical so as to achieve the optimal measurement effect.

The measuring device disclosed by the present invention can also be provided with an output terminal, and the output terminal can output the liquid volume data in the form of voice, characters or images.

Figure 4:
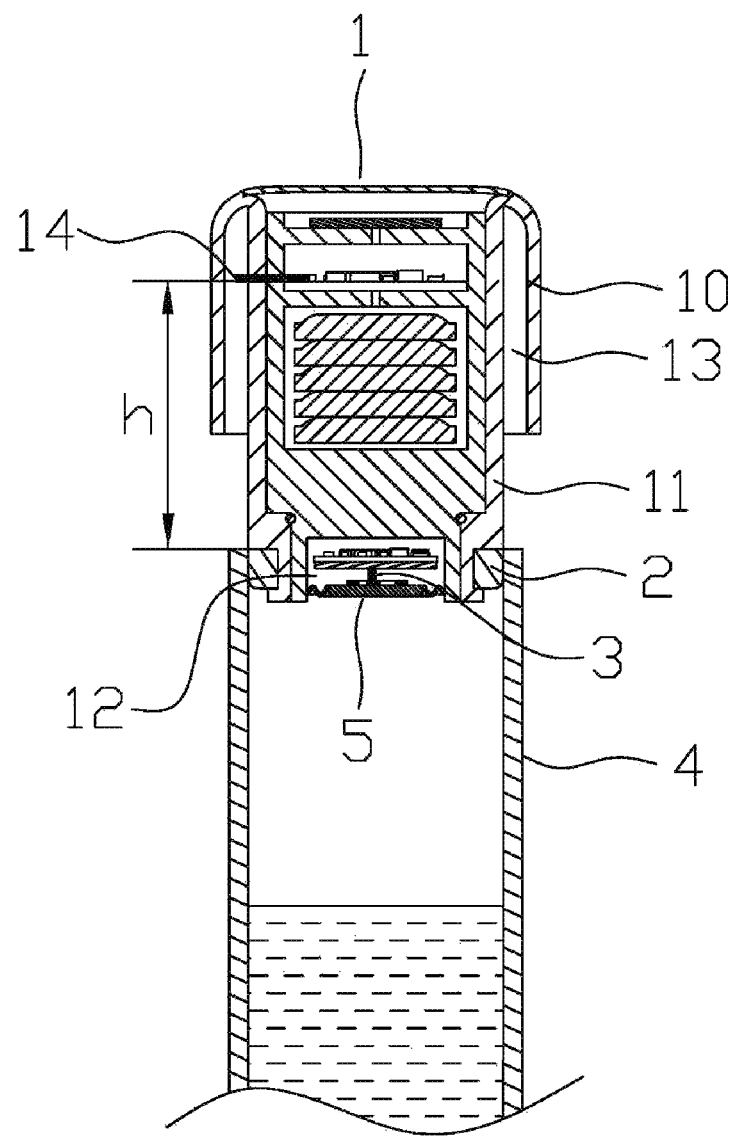
FIG. 4 is a cross-sectional view of an embodiment of the measuring device according to the present invention.

Referring to FIG. 4, a cross-sectional schematic diagram of a specific embodiment of the measuring device is shown, the compression member 1 comprises a circular cover body 10, comprising a bottom wall and a rim arranged along a circumferential direction of the bottom wall, an extending part 11 is arranged on the inner side of the bottom wall, and the extending part 11 is preferably cylindrical, and a gap 13 is formed between the extending part and the rim for containing the container. A sealing structure is arranged on the periphery of the extending part 11 of the container opening, in the embodiment, the sealing structure is preferably a sealing ring 2; and when the container opening is inserted into the gap, the inner wall of the container is matched with the sealing ring 2, and the sealed space is formed in the container.

The pressure sensor 3 and the force transmission member 5 are arranged on the extension part 11, specifically, a cavity 12 communicated with the outside is formed in the extending part 11, and the pressure sensor 3 is fixed in the pressure sensor 3. The cavity 12 is isolated from the sealed space through the force transmission member 5, namely the two sides of the force transmission member are respectively provided with the sealed space and the cavity; when the air pressure in the sealed space is increased, the pressure exerted on the pressure sensor 3 by the force transmission member is also synchronously increased, thus realizing the positive correlation between the air pressure change and the pressure change, in the scheme, the area of the stress surface of the force transmission member 5 is determined and known.

Figure 5:
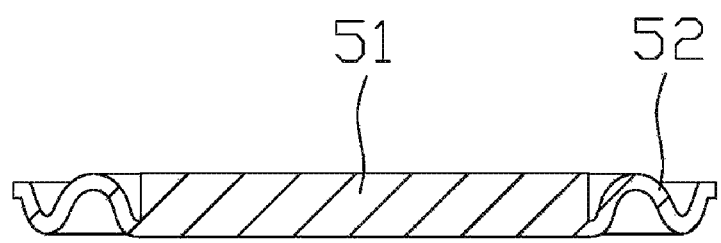
FIG. 5 is a cross-sectional view of an embodiment of the force transmission member according to the present invention.

Referring to FIG. 5, preferably, in order to achieve a better transmission effect, the force transmission member 5 comprises a rigid force-bearing sheet 51. The rigid force-bearing sheet is hermetically connected with the inner wall of the cavity through a flexible silicon sheet 52 arranged on the periphery of the rigid force-bearing sheet; since the stress required for deformation of the flexible silicon sheet is extremely small, the air pressure in the sealing cavity is transmitted to the pressure sensor basically without loss, and the measurement accuracy is guaranteed. The flexible silicon sheet 52 is of a wave-shaped structure so as to further reduce the stress value.

As an improvement scheme of the embodiment, a temperature measuring device (such as a temperature sensor and the like, not shown) for measuring the temperature of the force-bearing sheet is further included to facilitate the user to grasp the temperature of the liquid in the container in real time. Specifically, the rigid force-bearing sheet is made of a heat-conducting material, and through the transfer of heat, the temperature of the rigid force-bearing sheet is gradually kept consistent with the temperature of the liquid, and realizing measurement through the heat conduction contact between the temperature measuring device and the force-bearing sheet; in addition, the temperature measuring device can also be a non-contact device such as infrared measurement, the present invention do not limit the temperature measurement mode.

In order to eliminate the interference of temperature to the pressure sensor, a temperature insulation layer (not shown) is preferably arranged between the pressure sensor and the force-bearing sheet, and the temperature insulation layer not affects the pressure exerted on the pressure sensor by the force transmission member.

Figure 9:
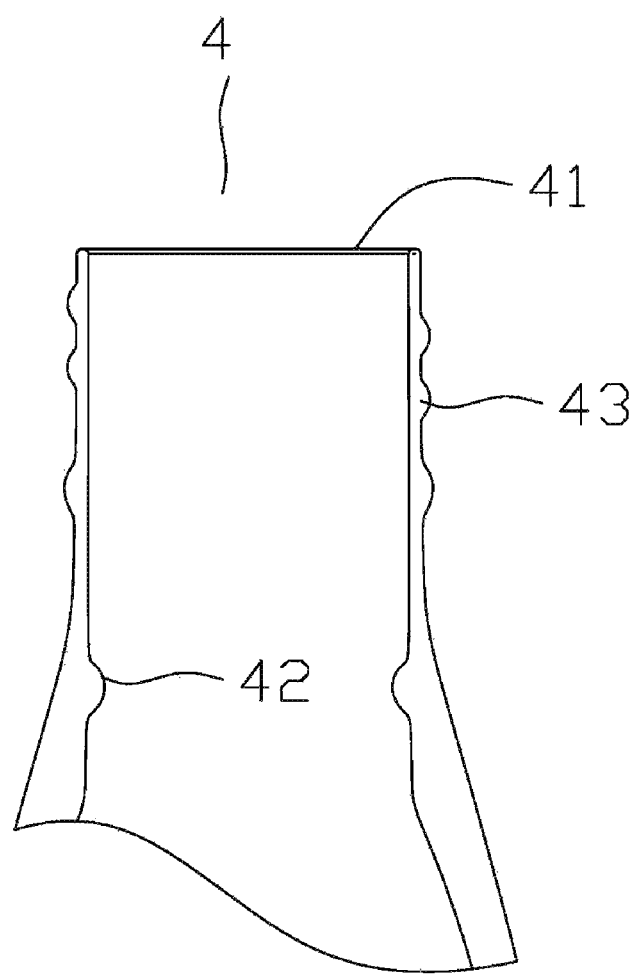
FIG. 9 is a cross-sectional view of an embodiment of a container according to the present invention.

The present invention further discloses a container for measuring the volume of internal liquid. Referring to FIG. 9, the container 4 is provided with a container opening 41, the compression member 1 is buckled on the container 4; the container opening 41 is inserted into the gap 16 between the cover body 10 and the extension part 11, and is in sealed connection with the extending part 11, and a sealed space is formed in the container. By pressing down or rotating the cover body, the extending part 11 is driven to further extend into the sealed space, so that the air in the sealed space can be compressed.

Preferably, the inner wall of the container 4 is provided with a protrusion 42, and the extending part 11 extends into the container, the sealing ring 2 is extruded by the protrusion 42 to deform so as to achieve a better sealing effect and position the starting point of pressure reduction more accurately.

Preferably, the container 4 has a conductive function, and a conductive part can be arranged at the container opening 41, or may be made of a conductive material as a whole.

Preferably, the outer wall of the container 4 is provided with external thread 43 matched with the thread 15.

The present invention further discloses a method for measuring the liquid volume in the container based on pressure sensing, referring to FIG. 10, comprising the following steps:

S10, forming a sealed space in the container through a compression member, a pressure sensor and a force transmission member are arranged on the compression member, the force transmission member can convert the air pressure in the sealed space into the pressure applied to the pressure sensor, and the area value of the stress surface is a determined value; the pressure sensor detects the pressure value from the force transmission member before and after compression.

S20, compressing the air in the sealed space through the movement of the compression member relative to the container.

S30, obtaining a liquid quantity detection parameter, comprising the air pressure value in a sealed space before compression, the pressure value detected by the pressure sensor before compression, the pressure value detected by the pressure sensor after the compression, the area value of the stress surface of the force transmission member, the volume value of air compressed in the container and the volume value of the container.

S40, acquiring the liquid volume in the container by using the liquid quantity detection parameter.

The method for obtaining the volume value of the air in the container is as follows: enabling the cross section area of the compression member perpendicular to the movement direction and directly acting on of the air fixed and known, obtaining the motion distance value of the compression member; and the value of the air compressed is obtained by combining the cross section area and the distance value.

The present invention discloses two methods for obtaining the motion distance value of the compression member:

1. arranging a limiting device, so that the distance between every time of movement of the compression member is fixed and is known.

2. connecting the compression member with the container through a thread, and the thread pitch of the thread is fixed and known, detecting the angle value of the rotation of the compression member, and calculating the distance value through the angle value and the thread pitch. Specifically, an angle sensor is arranged, the value is recorded as a first angle value when the air begins to be compressed, and the value is recorded as a second angle value in the rotation process or at the end of rotation; the difference value of the second angle value and the first angle value is the angle value of the rotation of the compression member at the corresponding moment.

For the first method, it is usually used in combination with a limiting device, and after the compression member moves to the limit position, the limiting devices are triggered and the pressure detection device starts to detect the air pressure in the container, this is the static detection method.

For the second method, the pressure sensor detects the change of air pressure in real time (or at a certain fast frequency) when the compression member is separated from the container; recording the first pressure value corresponding to the first angle value as the compression member contacts the container and begins to form the sealed space, similarly, recording the second pressure value in the rotation process or at the end of rotation; in addition, a plurality of values can be recorded; by combining any set of angle values and pressure values, a corresponding liquid quantity value can be obtained, and the measuring result is more accurate by combining a plurality of the liquid quantity values.

In addition, in step S30, the method for obtaining the ambient air pressure value by detecting of the pressure sensor, and then obtaining the pressure value in the sealed space before compression according to the relationship that the pressure value in the sealed space before compression is equal to the ambient air pressure value.

S40, acquiring the liquid volume in the container by using the liquid quantity detection parameters, and preferably, the method specifically comprises the following steps:

1. obtaining the difference value of the pressure change in the sealed space before and after compression and the air pressure value in the sealed space after compression, according to the formula:

$$\Delta P = (F_1 - F_0)/S$$

$$P_1 = P_0 + \Delta P$$

wherein, $\Delta P$ is the difference value of the pressure change in the sealed space before and after compression, $F_0$ is the pressure value obtained by detecting the pressure sensor before compression, and $F_1$ is the pressure value obtained by detecting the pressure sensor after compression, $P_0$ is the air pressure value in the sealed space before compression, and $P_1$ is the air pressure value in the sealed space after compression, and S is the area value of the stress surface of the force transmission member;

2. obtaining the volume value of the air in the container before compression according to the formula:

$$V_1 = P_1 V_X/(P_0 - P_1)$$

wherein $V_1$ is the volume value of the air in the container before compression, $V_X$ is the volume value of the compressed air in the container.

3. obtaining the liquid volume in the container according to the formula:

$$V_2 = V - V_1$$

wherein $V_2$ is the volume value of the liquid in the container, and V is the volume value of the container.

The above is a specific description of the preferred embodiment of the present invention, However, the present invention is not limited to the embodiments, and various equivalent deformation or substitutions may be made by those skilled in the art without departing from the spirit of the present invention, these equivalent variations or replacements are included in the scope of the claims of the present application.

What is claimed is:

1. A device for measuring a liquid volume in a container based on pressure sensing, comprising:
    a compression member; the compression member is hermetically connected to the container to be detected to form a sealed space in the container, and compresses air in the sealed space under an external force; a volume value of the compressed air is a determined value;
    a pressure sensor and a force transmission member; the force transmission member converts an air pressure in the sealed space into pressure applied to the pressure sensor, and an area value of a stress surface is a determined value; the pressure sensor detects a pressure value from the force transmission member before and after the compression;
    an air pressure sensor for detecting an ambient air pressure value; and
    a controller; the controller is configured to receive the pressure value obtained by the pressure sensor and the ambient air pressure value obtained by the air pressure sensor, and calculates the liquid volume in the container to be detected based on the pressure value, the ambient air pressure value, the volume value, the area value and the volume value of the container to be detected.

2. The device for measuring the liquid volume in the container based on pressure sensing according to the claim 1, characterized in that the device further comprises at least one limiting device for limiting a movement of the compression member after the compression member moves a fixed distance.

3. The device for measuring the liquid volume in the container based on pressure sensing according to claim 2, characterized in that there are at least two limiting devices and the two limiting devices are located on a same horizontal plane, and the limiting devices are made of a conductive material; the pressure sensor performs a first detection of the pressure value before compression; and performs a second detection of the pressure value in the sealed space when being conducted between the limiting devices.

4. The device for measuring the liquid volume in the container based on pressure sensing according to claim 2, characterized in that the limiting device comprises at least one fixing member and an elastic member correspondingly arranged under the fixing member; the fixing member and the elastic member are made of conductive materials; the elastic member moves elastically so as to have a first state of conducting with the fixing member and a second state of disconnecting from the fixing member; the pressure sensor performs the first detection of the pressure value before compression, and performs the second detection of the pressure value when the elastic member is in the first state.

5. The device for measuring the liquid volume in the container based on pressure sensing according to claim 1, characterized in that the compression member is a cover body, and the cover body is provided with an extending part with a fixed and known size; and a sealing ring is arranged on a periphery of the extending part.

6. The device for measuring the liquid volume in the container based on pressure sensing according to claim 5, characterized in that a cavity communicated with the outside is provided on the extending part, and the cavity is isolated from the sealed space through the force transmission member, and the pressure sensor is arranged in the cavity.

7. The device for measuring the liquid volume in the container based on pressure sensing according to claim 6, characterized in that the force transmission member comprises a rigid force-bearing sheet, the rigid force-bearing sheet is hermetically connected with an inner wall of the cavity through a flexible silicon sheet arranged on the periphery of the rigid force-bearing sheet, and the flexible silicon sheet is of a wave-shaped structure.

8. The device for measuring the liquid volume in the container based on pressure sensing according to claim 7, characterized in that the device further comprises a temperature measuring device for measuring a temperature of the rigid force-bearing sheet, and the rigid force-bearing sheet is made of a heat conduction material.

9. The device for measuring the liquid volume in the container based on pressure sensing according to claim 8, characterized in that a temperature insulation layer is arranged between the rigid force-bearing sheet and the pressure sensor.

10. The device for measuring the liquid volume in the container based on pressure sensing according to the claim 9, characterized in that the volume detection device comprises an angle sensor and a thread arranged on the compression member, a thread pitch of the thread is fixed and known; the angle sensor is used for detecting a rotating angle value of the compression member, and transmitting the angle value to the controller.

11. The device for measuring the liquid volume in the container based on pressure sensing according to claim 1, characterized in that the device further comprises:
a volume detection device arranged on the compression member and used for detecting the volume value of the compressed air;
the controller is configured to receive the pressure value obtained by the pressure sensor and the ambient air pressure value obtained by the air pressure sensor, and calculate the liquid volume in the container to be detected based on the pressure value, the ambient air pressure value, the volume value, the determined area value and the volume value of the container to be detected.

12. A container for measuring an internal liquid volume, wherein the container is provided with a container opening and comprises the device for measuring the liquid volume in the container based on pressure sensing of claim 1, the device is hermetically connected with the container opening through the compression member, and the sealed space is formed in the container.

13. The container for measuring the internal liquid volume according to claim 12, characterized in that a protrusion for winding a circle is arranged on an inner wall of the container, and the container opening is made of a conductive material.

14. A method for measuring a liquid volume in a container based on pressure sensing, comprising the following steps:
S10, forming a sealed space in the container through a compression member; a pressure sensor and a force transmission member are arranged on the compression member, the force transmission member converts an air pressure in a sealed space into pressure applied to the pressure sensor, and an area value of a stress surface is a determined value; the pressure sensor detects the pressure value from the force transmission member before and after compression;
S20, compressing the air in the sealed space through movement of the compression member relative to the container;
S30, obtaining a liquid quantity detection parameter, comprising an air pressure value in the sealed space before compression, a pressure value detected by the pressure sensor before compression, a pressure value detected by the pressure sensor after the compression, an area value of the stress surface of the force transmission member, a volume value of the compressed air in the container, and a volume value of the container; and
S40, acquiring the liquid volume in the container by using the liquid quantity detection parameter.

15. The method for measuring the liquid volume in the container based on pressure sensing according to claim 14, characterized in that the method for obtaining the volume value of the air in the container in the step S30 comprises: enabling an area of a compression surface on the compression member perpendicular to a movement direction and directly acting on the air is fixed and known, obtaining a movement distance value of the compression member; and the volume value of the compressed air is obtained by combining the area of the compression surface and the movement distance value.

16. The method for measuring the liquid volume in the container based on pressure sensing according to claim 15, characterized in that the method for obtaining the movement distance value of the compression member comprises the following steps: arranging a limiting device, so that the movement distance of the compression member each time is fixed and known.

17. The method for measuring the liquid volume in the container based on pressure sensing according to claim 16, characterized in that the method for detecting the angle value detection comprises: arranging an angle sensor, recording the value when the air begins to be compressed as a first angle value, and recording the value in the rotation process or at the end of rotation as a second angle value; and a difference value of the second angle value and the first angle value is the angle value of rotating the compression member at the corresponding moment.

18. The method for measuring the liquid volume in the container based on pressure sensing according to claim 15, characterized in that the method for obtaining the movement distance value of the compression member comprises: connecting the compression member with the container through a thread, and a thread pitch of the thread is fixed and known, detecting the angle value of rotating the compression member, and calculating the distance value through the angle value and the thread pitch.

19. The method for measuring the liquid volume in the container based on pressure sensing according to claim 14, characterized in that the method for obtaining the air pressure value in the sealed space before compression in the step S30 comprises: obtaining the ambient air pressure value by detecting the air pressure sensor, and then obtaining the pressure value in the sealed space before compression based on the pressure value in the sealed space before compression is equal to the ambient air pressure value.

20. The method for measuring the liquid volume in the container based on pressure sensing according to claim 14, characterized in that the method for acquiring the liquid volume in the container in the step S40 is as follows:
obtaining a difference value of a pressure change in the sealed space before and after compression and the air pressure value in the sealed space after compression, according to the formula:

$$\Delta P = (F_1 - F_0)/S$$

$$P_1 = P_0 + \Delta P$$

wherein, $\Delta P$ is the difference value of the pressure change in the sealed space before and after compression, $F_0$ is the pressure value obtained by detecting the pressure sensor before compression, and $F_1$ is the pressure value obtained by detecting the pressure sensor after compression, $P_0$ is the air pressure value in the sealed space before compression, and $P_1$ is the air pressure value in the sealed space after compression, and $S$ is the area value of the stress surface of the force transmission member;
then, obtaining the volume value of the air in container before compression according to the formula:

$$V_1 = P_1 V_X/(P_0 - P_1)$$

wherein $V_1$ is the volume value of the air in the container before compression, $V_X$ is the volume value of the compressed air in the container; and
obtaining the liquid volume in the container according to the formula:

$$V_2 = V - V_1$$

wherein $V_2$ is the volume value of the liquid in the container, and V is the volume value of the container.

* * * * *